LOOTLAND VEHICLES
11.12
NO PRINTED SPECIFICATION AVAILABLE
F. Klein,
BEST AVAILABLE COPY
Skate,
№ 182, A.I. Patented Dec. 22, 1857.
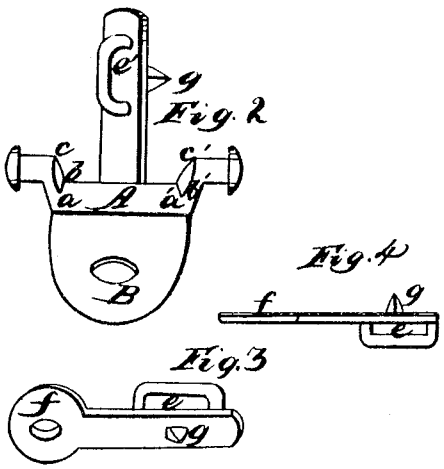
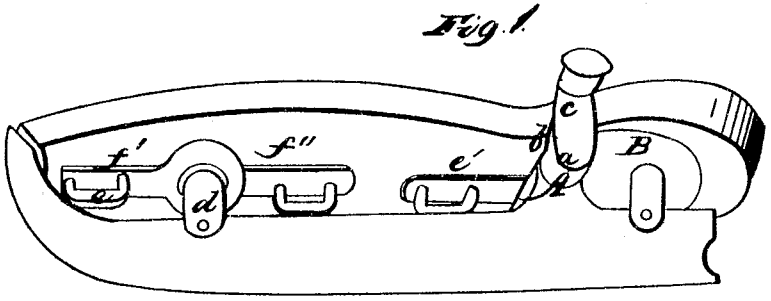
AM. PHOTO-LITHO. CO. N.Y. (OSBORNE'S PROCESS)